G. W. McCAUSLIN.
PASSENGER VEHICLE.
APPLICATION FILED FEB. 17, 1917.
1,267,242.
Patented May 21, 1918.
8 SHEETS—SHEET 6.
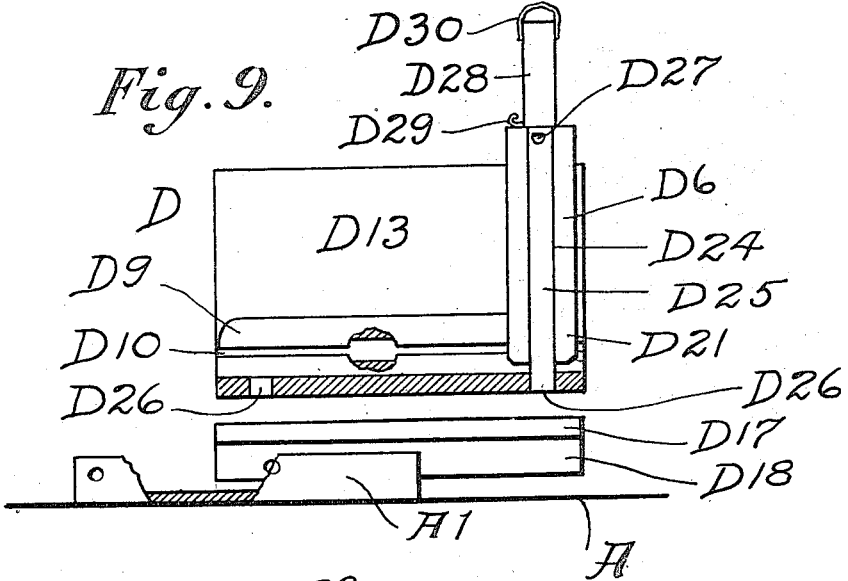
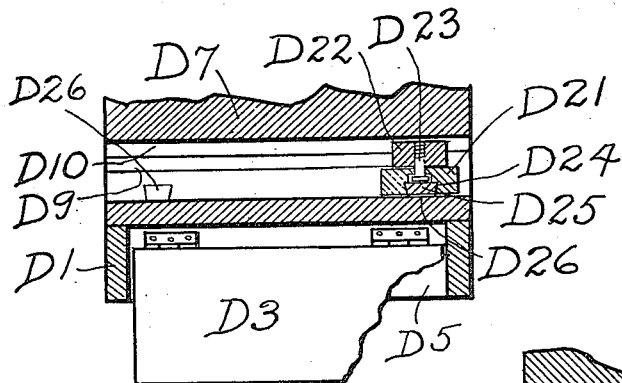
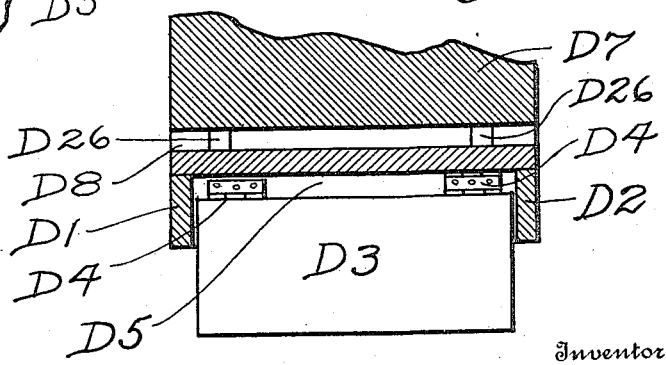
Inventor
George W. McCauslin
By
Cyrus Kehr
Attorney G. W. McCAUSLIN.
PASSENGER VEHICLE.
APPLICATION FILED FEB. 17, 1917.
1,267,242.
Patented May 21, 1918.
8 SHEETS—SHEET 7.
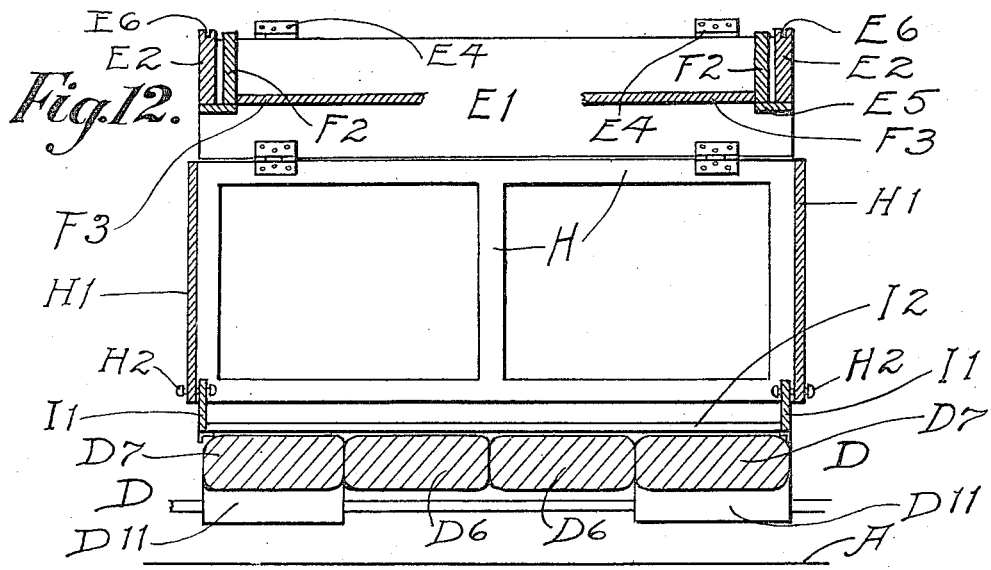
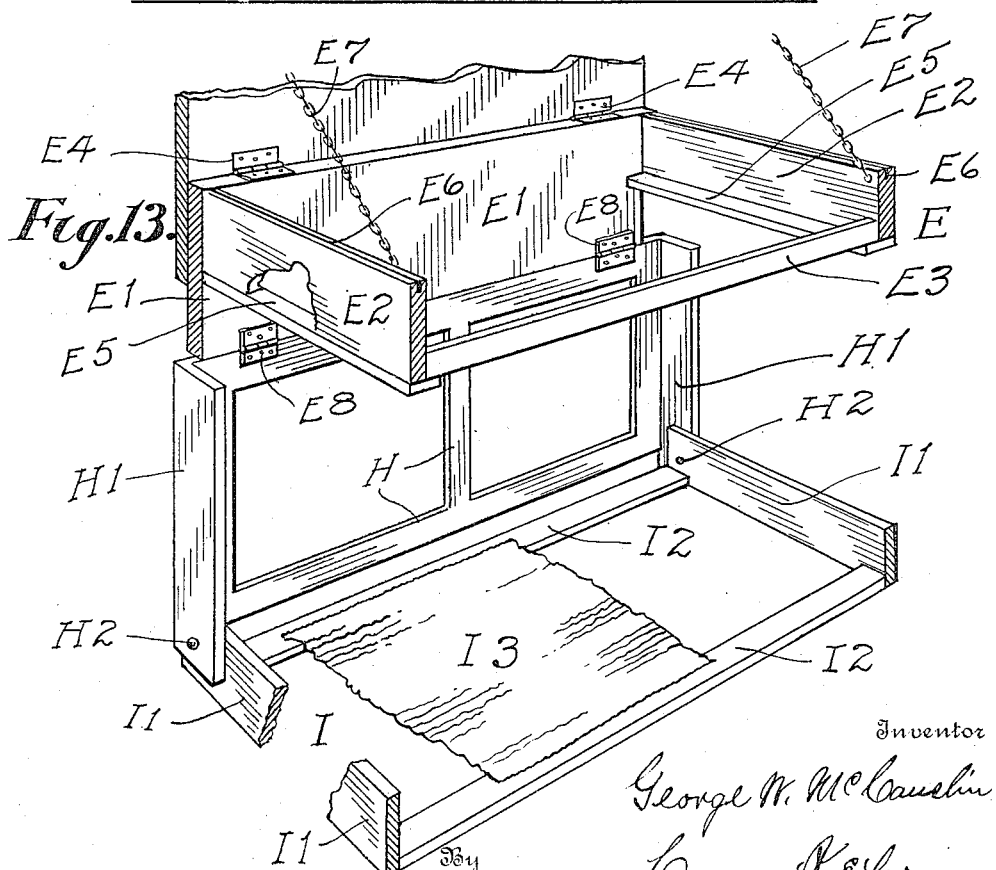
Inventor
George W. McCauslin
By Cyrus Kehr
Attorney G. W. McCAUSLIN.
PASSENGER VEHICLE.
APPLICATION FILED FEB. 17, 1917.

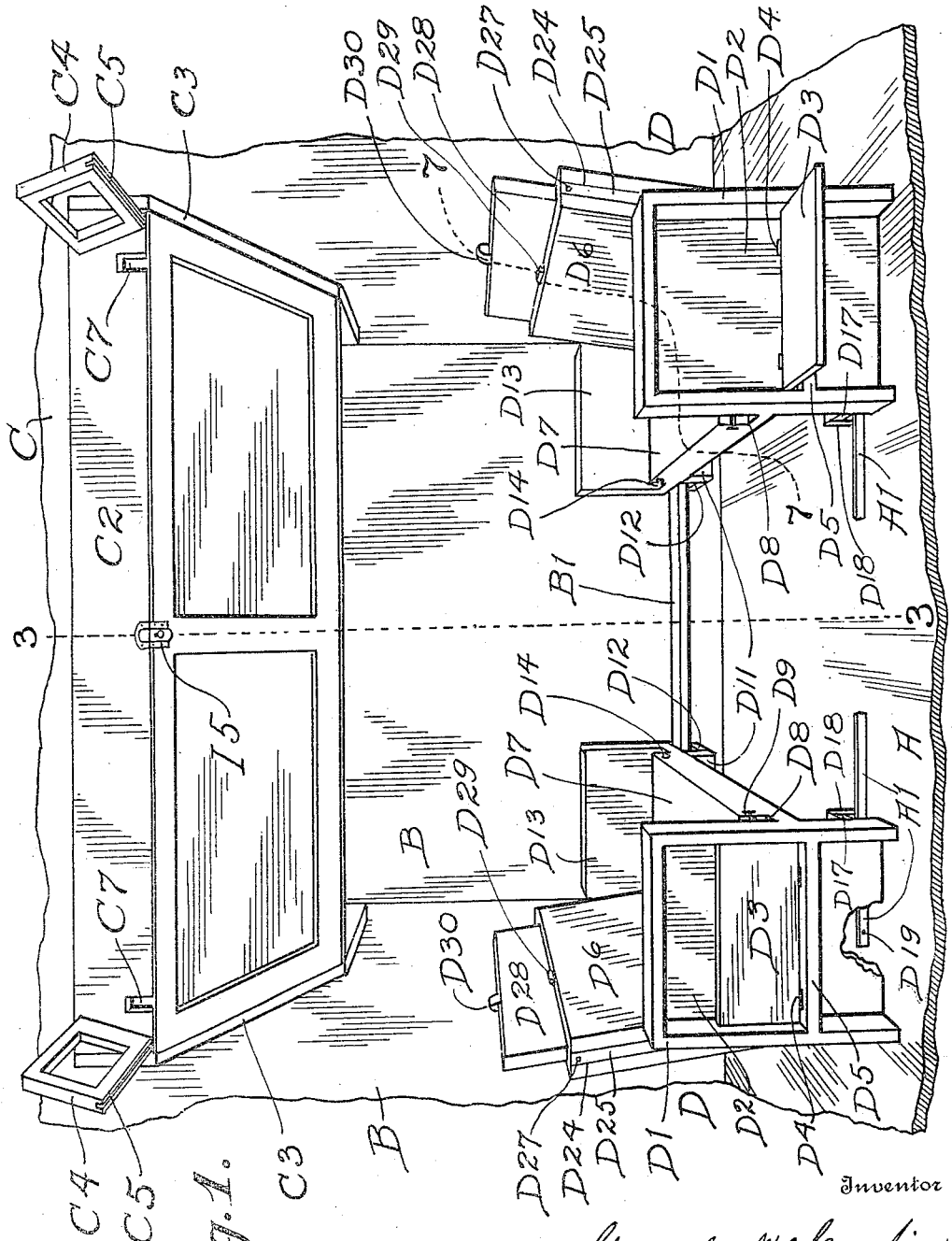

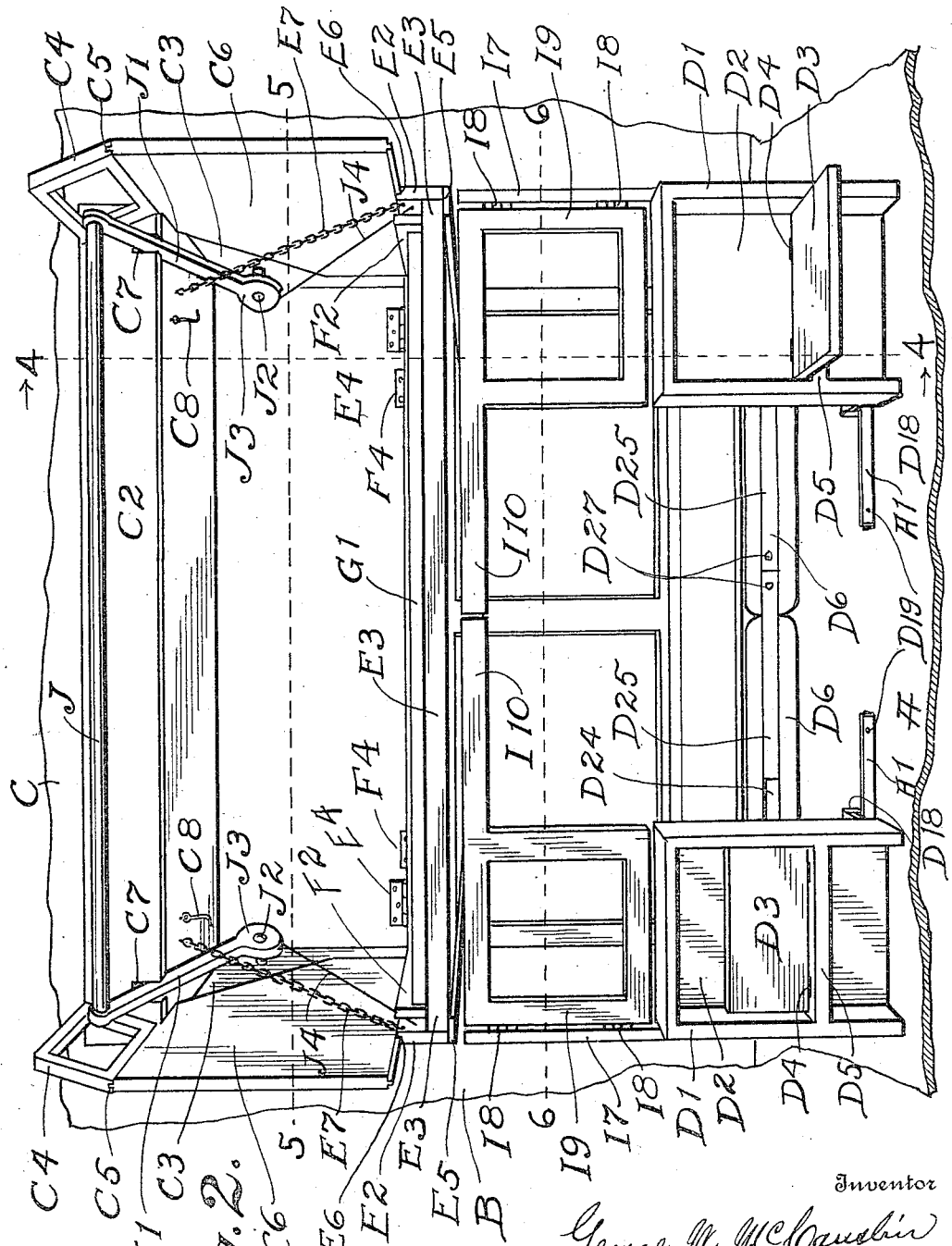

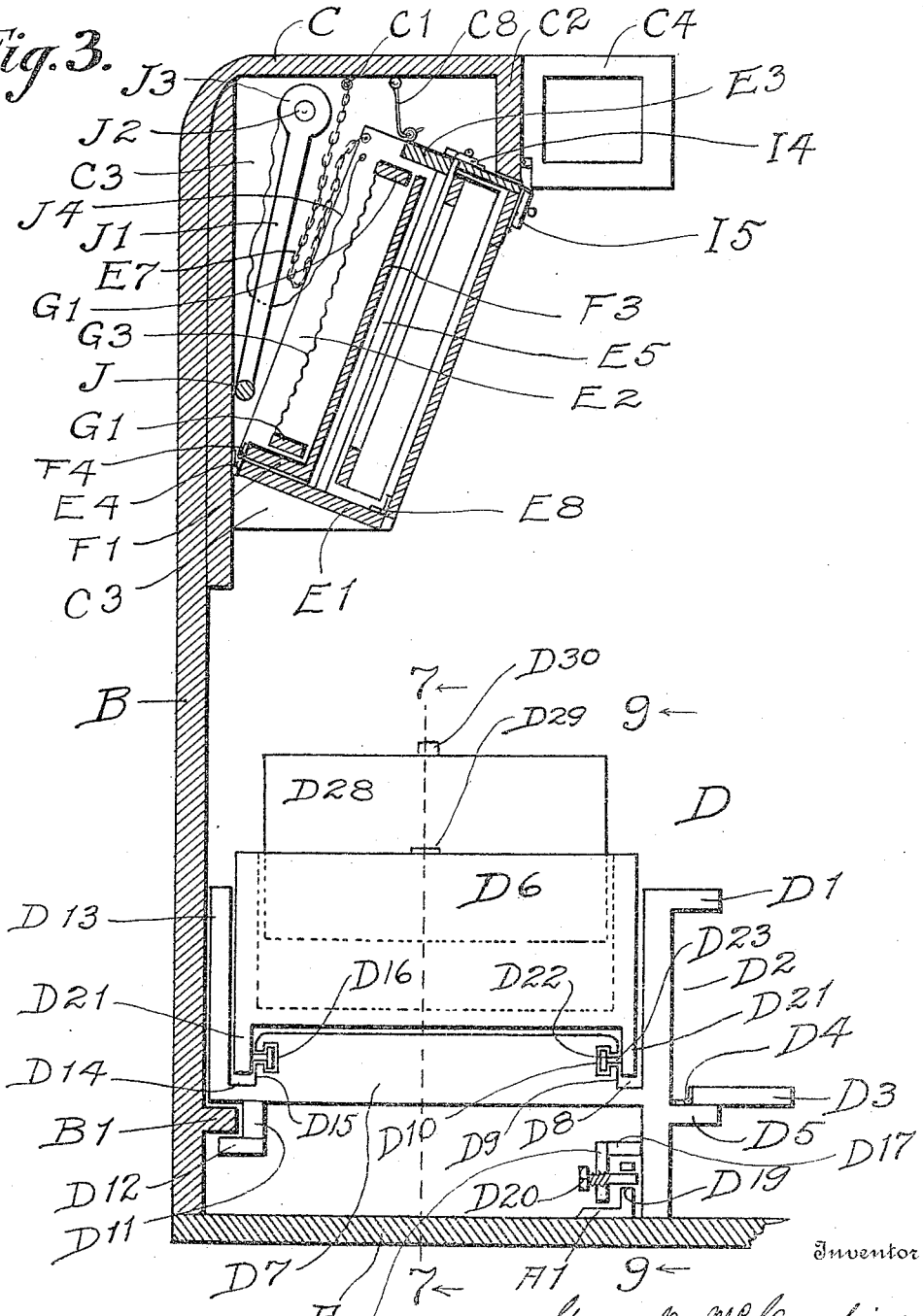

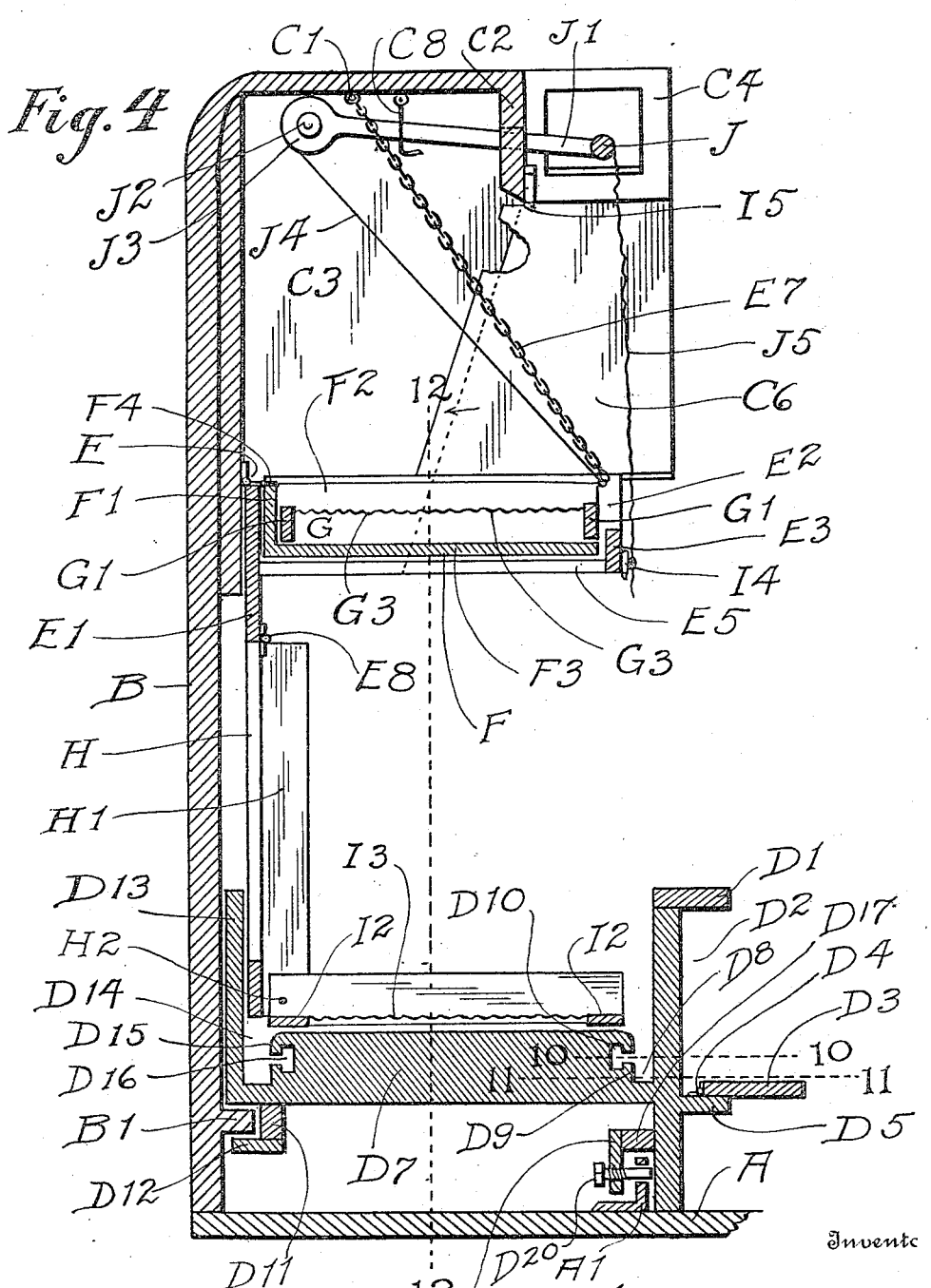

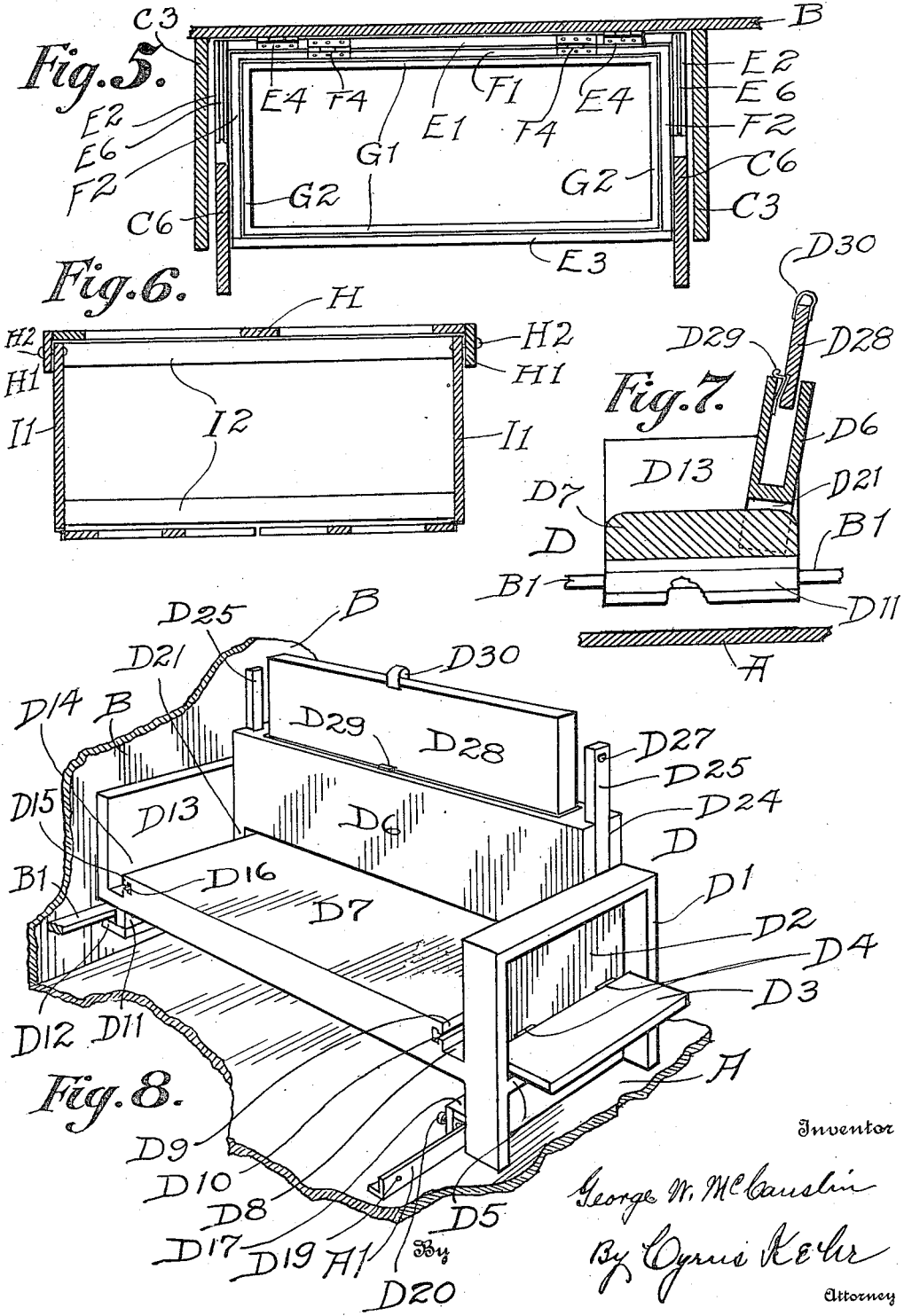

1,267,242.

Patented May 21, 1918.
8 SHEETS—SHEET 8.

Inventor
George W. McCauslin
By Cyrus Kehr
Attorney

UNITED STATES PATENT OFFICE.

GEORGE W. McCAUSLIN, OF STAMFORD, CONNECTICUT.

PASSENGER-VEHICLE.

1,267,242. Specification of Letters Patent. Patented May 21, 1918.

Application filed February 17, 1917. Serial No. 149,294.

*To all whom it may concern:*

Be it known that I, GEORGE W. McCAUSLIN, a citizen of the United States, residing at Stamford, in the county of Fairfield and State of Connecticut, have invented a new and useful Improvement in Passenger-Vehicles, of which the following is a specification, reference being had to the accompanying drawing.

My improvement relates particularly to passenger cars in which provision is made for sleeping berths and for seats, the seats being convertible into sleeping berths.

The object of my improvement is to provide such a construction in simple and efficient and convenient form and in which the seats may be adjusted to face in either direction.

In the accompanying drawings,

Figure 1 is a perspective view looking at one section of the car from the opposite side of the car, the upper berth being folded, and the lower berth being converted to form seats;

Fig. 2 is a similar view of the same mechanism, the berths being made ready for sleeping, excepting that the berth curtains are omitted;

Fig. 3 is an upright section on the line, 3—3, of Fig. 1, looking toward the right;

Fig. 4 is an upright section on the line, 4—4, of Fig. 2, looking toward the right, the berth curtains being omitted;

Fig. 5 is a horizontal section on the line, 5—5, of Figs. 2 and 4;

Fig. 6 is a horizontal section on the line, 6—6, of Figs. 2 and 4;

Fig. 7 is an upright section on the line, 7—7, of Figs. 1 and 3;

Fig. 8 is a perspective view of one of the seats;

Fig. 9 is an upright section on the line, 9—9, of Figs. 3 and 4;

Fig. 10 is a horizontal section on the line, 10—10, of Fig. 4;

Fig. 11 is a horizontal section on the line, 11—11, of Fig. 4;

Fig. 12 is a section on the line, 12—12, of Fig. 4, looking toward the left, portions being broken away;

Fig. 13 is a perspective view of the upper and lower berth structures, portions being broken away;

Figure 14:
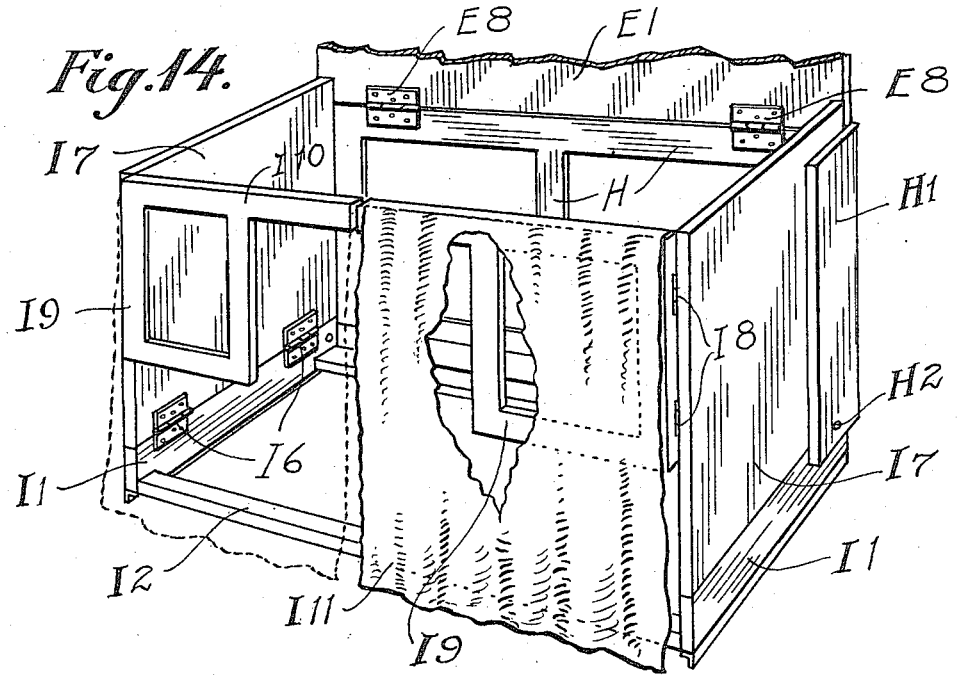
Fig. 14 is a perspective view of portions of the lower berth structure, including the lower curtains.
Figure 15:
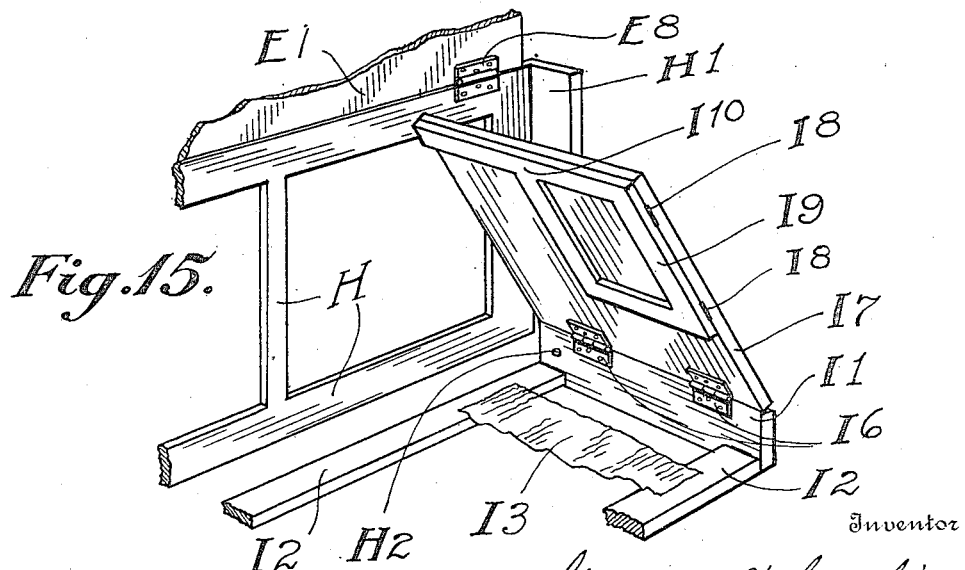
Fig. 15 is a similar perspective view showing only the right hand portion of what is shown in Fig. 14, the curtain frame having been turned rearward and leftward against the adjacent head board preparatory to turning the latter downward into the horizontal position.

Referring to said drawings, A is the floor of the car, B is one of the side walls of the car, and C is a portion of the ceiling of the car.

Two seats, D, form a part of each section, and it may be assumed that each section is divided into four transverse and approximately equal quarters, and that the seat body is as wide as one of said quarters. These seats are normally placed on the floor at each end of the section (in the end quarter) perpendicularly to the adjacent wall, B, and facing each other and having space between them. But these seats are movable horizontally and parallel to the wall, B, and their backs are also shiftable to change the facing of the seat. Said backs are also used to form a part of the horizontal surface of the lower berth when the section is to be used for sleeping.

The inner end of the seat body, $D^7$, rests on the horizontal ledge, $B^1$, which is supported by the wall, B, a short distance above the floor, A. The outer end of the seat is supported by the upright end member, $D^1$, which rises above said body. In the upper portion of the outer side of said end member is a recess, $D^2$, in which is a rectangular plate, $D^3$. Hinges, $D^4$, secure the lower edge of said plate to the end member, $D^1$, rearward of the outer face of said member. Normally said plate is in the upright position in said recess; but said plate may be turned outward on its hinges until it is in the horizontal position and resting on the portion, $D^5$, of the end member which extends outward from said hinges to form a bearing for said plate. In that position, said plate forms a step or auxiliary seat. It may be used as a step for ascending to or descending from the upper berth. At the inner side of the end member, $D^1$, the seat body, $D^7$, has a recess, $D^8$, extending downward from the upper face of and entirely across said body. In the upright face, $D^9$, of said recess is formed a horizontal, dovetail groove or channel, $D^{10}$.

At the opposite end of said seat and below the seat body, $D^7$, is an upright plate, $D^{11}$, extending crosswise of the lower face of the body, $D^7$, and secured thereto. A horizontal tongue, $D^{12}$, is secured to said plate, $D^{11}$, and extends beneath the ledge, $B^1$, on the wall, B, on which ledge the seat body, $D^7$, rests, as already described. The seat body has an upright end wall, $D^{13}$, parallel and close to the wall, B. Adjacent said end wall, the seat body has a recess, $D^{14}$, corresponding to the recess, $D^8$, and in the upright face, $D^{15}$, of said recess is a horizontal, dove-tail channel or groove, $D^{16}$, corresponding to the groove or channel, $D^{10}$, at the other end of the seat body.

At the inner side of and parallel to the end member, $D^1$, a guide strip, $A^1$, is secured immovably to the floor, A. Immediately above the strip, $A^1$, a spacing member, $D^{17}$, is secured to said end member. Said spacing member is a little wider than the width of said guide strip. An upright plate, $D^{18}$, lies against the inner face of the spacing member, $D^{17}$, and extends below said member and along the inner face of the guide strip, $A^1$. Thus the plate, $D^{18}$, and the lower portion of the end member, $D^1$, are at opposite sides of said guide strip. This prevents the seat from moving endwise (transversely to the length of the car) and permits the seat, when not secured by other means, to be moved horizontally and parallel to the length of the car. The guide strip has two transverse apertures, $D^{19}$, and the plate, $D^{18}$, bears a bolt, $D^{20}$, threaded in said plate and adapted to enter either of said apertures when said bolt is brought opposite the aperture.

The seat is to be placed and secured in either of two positions. The first such position is at one end of the section space, in which position the seat body, $D^7$, may form one end of the horizontal position of the lower berth; and when the seat is in this position, the back is to be so placed as to cause the seat to face toward the middle of the section in which the seat is located. The second position is on the adjacent inner quarter of the section. By thus placing the alternate seats, the spaces between all the seats of the car become equal, and the backs of the seats are shiftable and all may be set to face in the same direction.

The back, $D^6$, rests between the end members, $D^1$, and $D^{13}$, and is movable across the seat body, $D^7$, horizontally and parallel to the length of the car and may be secured at either longitudinal edge of the seat body, whereby the seat may be made to face in either direction. The back is also adapted to be turned downward into the horizontal position and toward the other seat of the same section, to form a part of the horizontal surface of the lower berth.

In each of the grooves, $D^{10}$, and $D^{16}$, is a slide block, $D^{22}$, which is slidable in said grooves. At each end the back has a downward extension, $D^{21}$, reaching into the adjacent groove, $D^{10}$ or $D^{16}$. A horizontal axle, $D^{23}$, makes a pivotal connection between the slide block and the adjacent downward extension, $D^{21}$. In each end of the back, $D^6$, of the seat is an upright, dove-tail groove, $D^{24}$, in which rests slidably a locking bar, $D^{25}$. In the bottom of each recess, $D^8$ and $D^{14}$, the seat body has two sockets, $D^{26}$, in position to receive the lower end of said slidable locking bar, $D^{25}$, when the back is in one of its upright positions. Said sockets are preferably inclined, in order that the locking bars, when resting in said sockets, may be inclined as shown by the drawings. When the locking bars have been raised out of said sockets, the back of the seat may be turned on the axles, $D^{23}$, into the horizontal position in the adjacent inner quarter of the section, to form a part of the foundation for the lower berth.

The locking bars are preferably made of such length as to bring their upper ends even with the upper edge of the seat body when the lower ends of said bars rest in said sockets. Each locking bar has a recess, $D^{27}$, in which a tool or a finger may engage for sliding the bar.

A head rest, $D^{28}$, is telescoped into the upper portion of the back and is adapted to be raised to project above the body of the back as shown in Figs. 1, 3, 7, and 8. At its middle, the head rest has a spring stop, $D^{29}$, which bears on the upper edge of the back when the head rest is in its upper position. A pliable loop, $D^{30}$, on the upper edge of the head rest is to be engaged for lifting the head rest into its raised position. When the two backs of the same section are turned downward into the horizontal position to occupy the two middle quarters of the section, the lock bars, $D^{25}$, at the same ends of the backs are pushed endwise in the same direction until one of the bars lies in the groove of each back. The engagement of said bars in the grooves of the two backs causes said bars to sustain the meeting edges of the two backs.

Assuming that the two seats of the same section are located at the ends of the section spaces, and it is desired to make the lower berth, then nothing is to be done to either of the seats excepting to press the spring stops, $D^{29}$, inward and lower the head rests, $D^{28}$, entirely into the backs, $D^6$, raise the locking-bars, $D^{25}$, out of the sockets, $D^{26}$, and then turn the backs down into the horizontal position, in the inner quarters, and secure them to each other with the lock bars, $D^{25}$, as has been described.

For convenience in description, it will be assumed that the berth structures are unfolded.

For the upper berth, there is an open rectangular supporting frame, E, which has an upright rear piece, E¹, upright end pieces, E², and an upright front piece, E³, which is narrower than the pieces, E², and has its lower edge even with the lower edges of the piece, E², whereby the end pieces reach higher than said front piece. The rear piece extends below the end pieces. Hinges, E⁴, join the rear piece, E¹, to the wall, B, so that said frame may turn upward on said hinges. On the lower edge of each end strip, E², a ledge, E⁵, extends horizontally toward the middle of said frame. In the upper edge of each end piece, E², is a channel, E⁶, which receives an edge of a head board described later on. A chain, E⁷, or other tension member, has one end attached to the forward portion of said frame. The rear portion of said tension member is attached to the ceiling at C¹, in proper position to make said tension member taut when said frame is in the horizontal position. Said tension members are of sufficient strength to sustain the forward portion of said frame with such load as is put thereon.

Within the frame, E, is the upper berth body, F. This is of proper outline to fill the space within the frame, E. At its rear, said body has an upright horizontal strip, F¹, similar to the strip, E; and at each end, said body has an end piece, F², corresponding to the pieces, E², of the frame, E. Said body has a bottom, F³. At its front, said body has no front strip corresponding to the strip, E³. Said body rests upon the ledges, E⁵, of the frame, E. Hinges, F⁴, extend across the upper faces of the strips, E¹ and F¹, and join said body to the frame, E, in such manner as to allow the body to turn upward while said frame remains in the horizontal position.

Within the body, F, is a rectangular bed bottom, G, comprising front and rear pieces, G¹, and end pieces, G², and a horizontal fabric, G³. Said bed bottom rests on the floor, F³, of the body, F. Bedding is to be placed on the fabric, G³, of said bed bottom. Beneath said bottom is space for storing bedding belonging to the lower berth.

The rear strip, E¹, of the frame, E, extends downward below the end strips approximately as far as the height of the end strips.

At the lower edge of said rear strip, E¹, are hinges, E⁸, which are also connected to a connecting member, H, permitting said connecting member to turn upward. Said connecting member is in the form of a flat, open frame.

At each end of the connecting member, H, is an upright flange plate, H¹, extending forward of the connecting member perpendicularly to the wall, B.

The lower berth bed-bottom, I, comprises end pieces, I¹, and longitudinal bottom pieces, I², and a fabric, I³, extending horizontally over said bottom. Said fabric is preferably a flexible wire fabric resembling the woven wire fabric of an ordinary spring bed-bottom. The rear portion of said bed-bottom extends between the lower portions of the flange plates, H¹, and horizontal bolts, H², extend through said flanges and the adjacent end pieces, I¹, whereby said bed-bottom is adapted to be turned upward and folded flatwise against the connecting member, H, the upright dimension of said connecting member being such as to bring all of the lower bed-bottom below the hinges, E⁸, and so as to permit the folding of the connecting member upward against the frame, E, after the lower bed-bottom has been folded against the connecting member.

In this position, the bed-bottom, I, and the connecting member, H, are secured to the upper frame, E, by means of a latch I⁴, on the front part of the upper frame. This should be done while the upper frame is in the horizontal position. Then the upper frame, with the lower bed-bottom thus attached, may be turned upward on the hinges, E⁴, into the oblique or folded position. From the ceiling, C, a front piece, C², extends downward along the entire length of the section or the entire length of the car. The lower edge of said piece meets the adjacent edge of the connecting member, H, and a latch I⁵, secures said member to the piece, C².

On the upper edge of each end piece, I¹, of the lower bed-bottom, I, are hinges, I⁶, which are joined to the lower edge of a rectangular head board, I⁷, the lower edge of which is as long horizontally as the width of the lower bed-bottom and which is high enough to meet the lower face of the upper bed frame, E.

On each upright, front edge of each of said head boards are hinges, I⁸, which are connected to a curtain frame, I⁹, which extends from the upper edge of the end member, D¹, of the adjacent seat to the lower face of the upper frame, E. The body of said frame, I⁹, is rectangular and about as wide as the adjacent seat member, D¹. At its upper free corner, said frame has an arm, I¹⁰, extending horizontally parallel to the front edge of the upper bed frame, E, to the middle of said edge. Thus the arms, I¹⁰, of the two curtain frames, I⁹, meet at the middle of the section, and below said arms and between the bodies of said frames there is an open space forming an entrance to the lower berth.

To the upper edge of each of said curtain frames is attached a curtain, I¹¹, which extends downward close to the floor.

Each curtain frame with its curtain folds rearward on the hinges, I⁸, against the adjacent head board, I⁷. Then the head board is folded downward on the hinges, I⁶ flatwise upon the lower bed-bottom. Then the bed-bottom is ready to fold against the connecting member, H, in the manner above described.

Between sections, a partition, C³, is placed into the angle between the wall, B, and the ceiling, C. Said partition extends outward to the horizontal piece, C², and downward approximately to the outer face of the folded connecting member, H, thence obliquely downward along said member to its lower edge, and thence horizontally to the wall, B.

Near each partition, C³, a rectangular bracket, C⁴, is secured in the plane of said partition and with one edge bearing against the front piece, C², the lower edge of said bracket coming to the lower edge of said piece. Said lower edge has a groove, C⁵; and, as already described, the forward portion of the upper edge of the adjacent end piece, E², of the frame, E, is provided with a groove, E⁶. A head board, C⁶, is placed with its upper edge in the groove, C⁵, and its lower edge in the groove, E⁶. The inner edge of said head board is made oblique so as to fit approximately to the adjacent oblique edge of the partition, C³. The head board is preferably made to overlap the partition a short distance. In this manner, the two adjoining upper sections are separated from each other.

Above the front edge of the upper berth and near and parallel to the front piece, C², is a curtain rod, J, having its ends supported by arms, J¹, extending rearward and hinged to the partition, C³, by means of a horizontal stud, J². On the rear end of each arm and having said stud for an axle, is a grooved wheel segment, J³, to which is attached the upper end of the tension member, J⁴, the lower end of which is attached to the end piece, E², of the supporting frame, E. Said tension member lies in the groove of said wheel segment and is so attached as to hold the arm in the elevated position when the frame, E, is in its lower or horizontal position and so as to permit the turning of said arms and curtain bar downward by gravity when the frame, E, is being moved upward. The movement of these arms and the curtain bar is to be so timed relative to the movement of the frame, E, as to cause the curtain bar and said arms to move rearward in advance of said frame and occupy the space at the rear of said frame when the latter is in the folded position, as shown in Fig. 3.

For each arm, J¹, the lower edge of the front piece, C², has a notch, C⁷, into which the adjacent arm extends when the latter is in the raised position. In that position, said curtain rod and said arms are out of the path of the upper berth body, F, and the upper bed bottom, G. This permits turning said body and said bottom upward on the hinges, F⁴, and securing said body to the ceiling, C, by means of a hook, C⁸, which is secured to the ceiling, C, in proper position for this purpose. The body, F, and the bed bottom, G, are to be put into the upper position independently of the supporting frame, E, when the entire section is sold to the occupant of the lower berth. Curtains, J⁵, have their upper edges secured to the curtain rod, J, and extend downward a little below the supporting frame, E. Said curtains need not be removed when the mechanism is to be folded. When the curtain rod is moved downward and rearward, followed by the upward and rearward movement of the frame, E, and the parts supported thereby, the curtain will be drawn rearward into the space which remains behind the bed after the latter has been put into the upper position.

It will be observed that the upper berth can be made ready for sleeping without releasing the connecting member, H, and the lower berth bed-bottom, I, and without disturbing the seats, and without obstructing the lower berth space with curtains, the upper curtains covering only the upper berth space.

I claim as my invention,

1. In a passenger vehicle, a pair of seats relatively shiftable toward and from each other and each comprising a seat body and a shiftable back, said backs and said seat bodies being adapted to be arranged edge-to-edge in a horizontal plane to form continuous bed surface, the backs being between the seat bodies, substantially as described.

2. In a passenger vehicle, a pair of seats arranged parallel to each other and relatively shiftable toward and from each other and each having a hinged back, said backs being adapted to be turned down between and to the level of the bodies of said seats and meet each other, and means for staying said backs in the horizontal position, substantially as described.

3. In a passenger vehicle, a pair of seats relatively shiftable toward and from each other and each comprising a seat body, said bodies being separated from each other a distance equal to the combined widths of the backs, and said backs being adapted to be arranged edge-to-edge and in a horizontal plane which is common to the seat bodies to form a continuous bed surface, substantially as described.

4. In a passenger vehicle, a pair of seats arranged parallel to each other and relatively shiftable toward and from each other and each having a bodily shiftable hinged back, said backs being adapted to be turned down between and to the level of the bodies of said seats and meet each other, and means for staying said backs in the horizontal position, substantially as described.

5. In a passenger vehicle, a pair of seats relatively shiftable toward and from each other and each comprising a relatively stationary seat body and a shiftable back, said backs and said seat bodies being adapted to be arranged edge-to-edge in a horizontal plane to form a continuous bed surface, the backs being between the seat bodies, substantially as described.

6. In a passenger vehicle having an upright wall, a ledge on said wall, a pair of seats each having an end resting on said ledge and said seats being arranged parallel to each other relatively shiftable toward and from each other and each having a hinged back adapted to be turned down into the horizontal position in the space between the seat bodies and meet the other of said backs edge-to-edge, and means for staying said backs in the horizontal position, substantially as described.

7. In a passenger vehicle having an upright wall, a ledge on said wall, a seat placed perpendicularly to said wall and having one end resting on said ledge and the entire seat structure being adjustable horizontally and parallel to said wall and comprising a relatively stationary seat body and a shiftable back adapted to be turned downward into the plane of and beside the seat body, and another seat parallel to the first-mentioned seat and having a back adapted to be turned downward into the plane of and against the horizontally-placed back of the first-mentioned seat to form a continuous bed surface, substantially as described.

8. In a passenger vehicle having an upright wall, a ledge on said wall, a pair of seats each having an end resting on said ledge and said seats being arranged parallel to each other relatively shiftable toward and from each other and each having a shiftable, hinged back adapted to be turned down to the level of the body of said seat and meet the other of said backs, and means for staying said backs in the horizontal position, substantially as described.

9. In a passenger vehicle, a pair of seats comprising shiftable backs and seats separated from each other a distance equal to the combined widths of said backs and said backs being adapted to be turned into the horizontal position and edge-to-edge between the seats to form a continuous horizontal bed surface, means forming walls rising from the seat body side edges which are at the ends of said bed surface, and bed mechanism coupled to the vehicle and adapted to rest adjacent the ceiling and to be lowered to rest upon said bed surface, substantially as described.

10. In a passenger vehicle, a seat, a back adjustable horizontally from one edge to the other of the seat body, means slidably supporting one end of the seat, and an apertured guide strip on the vehicle floor, and means for securing said seat to said guide strip, substantially as described.

11. In a passenger vehicle, a shiftable seat comprising a relatively stationary seat body and a back movable from edge to edge of said body, and locking means engaging the seat body for securing said back when in position at either edge of the seat body, substantially as described.

12. In a passenger vehicle, a pair of seats relatively shiftable toward and from each other and comprising a seat body and a back movable from edge to edge of said body, and upright locking bars on said back for securing said back when in position at either edge of the seat body, substantially as described.

13. In a passenger vehicle, a seat comprising a seat body and a back, bearings by which one edge of the back is hinged to the seat body, said bearings being adjustable from one longitudinal edge to the other of the seat body, and means for securing the back in either of said positions, whereby said seat may be made to face in either direction and the back may be turned downward into the horizontal position at either side of the body, substantially as described.

14. In a passenger vehicle, a pair of seats each comprising a seat body and a back, bearings by which one edge of the back is hinged to the seat body, said bearings being adjustable from one longitudinal edge to the other of the body, and means for securing the back in either of said positions, whereby said seat may be made to face in either direction and the back may be turned downward into the horizontal position at either side of the body, substantially as described.

15. In a passenger vehicle, a seat comprising a seat body and a back, slidable bearing blocks by which the back is hinged to the seat body, said blocks being adjustable from one longitudinal edge to the other of the seat body, and means for securing the back in either of said positions, whereby said seat may be made to face in either direction and the back may be turned downward into the horizontal position at either side of the body, substantially as described.

16. In a passenger vehicle, a pair of seats each comprising a seat body and a back, slidable bearing blocks by which the back is hinged to the seat body, said blocks being adjustable from one longitudinal edge to the other of the seat body, and means for securing the back in either of said positions, whereby said seat may be made to face in either direction and the back may be turned downward into the horizontal position at either side of the body, substantially as described.

17. In a passenger vehicle, a pair of seats standing parallel to and spaced from each other and each having a seat body and a back hinged to said body and adapted to be turned into the horizontal position between said seats and fill one-half of the space between said seat bodies, and means carried by one of said backs for engaging and sustaining the other of said backs when said backs are in the horizontal position between said seat bodies, substantially as described.

18. In a passenger vehicle, a pair of seats standing parallel to and spaced from each other and each having a seat body and a back hinged to said body and adapted to be turned into the horizontal position between said seats and fill one-half of the space between said seat bodies, and means carried by one of said backs for locking said back in the upright position and for engaging and sustaining the companion back when the backs are in the horizontal position between the seat bodies, substantially as described.

19. In a passenger vehicle, a pair of seats standing parallel to and spaced from each other and each having a seat body and a back hinged to said body and adapted to be turned into the horizontal position between said seats and fill one-half of the space between said seat bodies, and said back having grooves in its ends and locking means in said grooves for engaging the seat body when the back is in the upright position and for engaging and sustaining the companion back when the backs are in the horizontal position between said seat bodies, substantially as described.

20. In a passenger vehicle, a pair of seats standing parallel to and spaced from each other and each having a seat body and a back hinged to said body and adapted to be turned into the horizontal position between said seats and fill one-half of the space between said seat bodies, and said back having grooves extending entirely along its ends and open at each edge, and lock bars slidable in said groove and adapted to project out of said grooves at one end into engagement with a relatively stationary part of the seat and to slide and project endwise out of the other end of the groove into the corresponding groove of the companion back when said backs are in the horizontal position, substantially as described.

21. In a passenger vehicle, a pair of seats, lower berth mechanism adapted to rest upon said seats and hinged to be turned upward adjacent the ceiling, substantially as described.

22. In a passenger vehicle, a seat having an approximately upright back which is shiftable to either edge of the seat body so as to face in either direction, and said back being recessed from above, a head rest telescoping into the recess of said back, substantially as described.

23. In a passenger vehicle, a pair of seats each having a back adapted to be turned down into the horizontal position to fill one-half the space between the bodies of said seats, and each of said backs having a shiftable extension by which the height of the back may be increased when the back is in the upright position, substantially as described.

24. In a passenger vehicle, a foldable berth mechanism pivoted parallel to the length of the berths and which when folded occupies a position adjacent the ceiling and a portion of which when unfolded forms a part of an upper berth and another portion of which when unfolded forms a part of a lower berth, substantially as described.

25. In a passenger vehicle, a foldable berth mechanism pivoted parallel to the length of the berths and which is supported by the vehicle adjacent the ceiling and which when folded occupies a position adjacent the ceiling and a portion of which when unfolded forms a part of an upper berth and another portion of which when unfolded forms a part of a lower berth, substantially as described.

26. In a passenger vehicle, a pair of seats, a foldable berth mechanism pivoted parallel to the length of the berths and which when folded occupies a position above said seats and adjacent the ceiling and a portion of which berth mechanism when unfolded forms a part of an upper berth and another portion of which when unfolded rests upon said seats to form a part of a lower berth, substantially as described.

27. In a passenger vehicle, a pair of seats, a foldable berth mechanism pivoted parallel to the length of the berths and which berth mechanism is supported by the vehicle adjacent the ceiling and which when folded occupies a position above said seats and adjacent the ceiling and a portion of which berth mechanism when unfolded forms a part of an upper berth and another portion of which when unfolded rests upon said seats to form a part of a lower berth, substantially as described.

28. In a passenger vehicle, an upper berth mechanism pivoted parallel to the length of said berth mechanism adjacent the ceiling and adapted to fold upward, and a lower berth mechanism pivoted parallel to its length to said upper berth mechanism and adapted to fold against the latter, substantially as described.

29. In a passenger vehicle, a pair of seats, an upper berth mechanism hinged along a side line adjacent the ceiling and adapted to turn upward, and a lower berth mechanism hinged along side lines to said upper berth mechanism and adapted to rest on said seats and to turn against the upper berth mechanism, substantially as described.

30. In a passenger vehicle, a pair of seats, a supporting frame hinged to the vehicle wall above the seats, upper berth members supported upon said frame, a lower berth bed bottom, means securing said bed bottom to said supporting frame in such manner as to permit said bed bottom to rest flatwise on said seats and to be folded flatwise against the lower portion of said supporting frame and to be secured thereto and folded upward and rearward with said frame, substantially as described.

31. In a passenger vehicle, a pair of seats, a supporting frame hinged to the vehicle wall above the seats, upper berth members supported upon said frame, a lower berth bed bottom, a connecting member joining said bed bottom to said supporting frame in such manner as to permit said bed bottom to rest flatwise on said seats and to be folded flatwise against the lower portion of said supporting frame and to be secured thereto and folded upward and rearward with said frame, substantially as described.

32. In a passenger vehicle, an upper berth mechanism adjacent the ceiling and adapted to turn upward, a connecting member coupled lengthwise to said upper berth mechanism, and a lower berth mechanism coupled lengthwise to said connecting member, and adapted to turn upon the latter, substantially as described.

33. In a passenger vehicle, an upper berth mechanism hinged adjacent the ceiling and adapted to turn upward, a connecting member coupled lengthwise to the upper berth mechanism and having forward extensions, and a lower berth mechanism coupled to said forward extensions and adapted to turn against said connecting member, substantially as described.

34. In a passenger vehicle, a pair of seats, an upper berth mechanism hinged adjacent the ceiling and adapted to fold upward, a connecting member hinged to said upper berth mechanism, and a lower berth mechanism coupled to said connecting member and adapted to rest upon said seats and to be folded against said connecting member, substantially as described.

35. In a passenger vehicle, an upper berth mechanism comprising two superposed hinged members adapted to assume a horizontal position and to be folded upward, the upper of said members being supported by the lower of said members when in the horizontal position and foldable independently of the lower member, substantially as described.

36. In a passenger vehicle, an upper berth mechanism comprising two hinged members adapted to assume a horizontal position and to be folded upward, the first of said members being supported by the second of said members when in the horizontal position and foldable independently of the second member, and a lower berth mechanism coupled to and foldable against said second member, substantially as described.

37. In a passenger vehicle, a hinged upper bed and hinged mechanism supporting said bed when the latter is in the horizontal position, said hinged mechanism comprising foldable lower berth mechanism, substantially as described.

38. In a passenger vehicle, a pair of seats, a hinged upper bed and hinged mechanism supporting said bed when the latter is in the horizontal position, said hinged mechanism comprising foldable lower berth mechanism adapted to rest upon said seats, substantially as described.

39. In a passenger vehicle, a supporting frame hinged to the vehicle wall, curtain-rod arms hinged to the vehicle above said supporting frame, tension members attached to said arms and said supporting frame to turn said arms into the horizontal position when said frame is turned into the horizontal position, a curtain-rod supported by said arms, and a curtain supported by said rod, substantially as described.

40. In a passenger vehicle, a berth mechanism comprising a rectangular supporting frame hinged to one of the walls of the vehicle, an upper berth body hinged to said supporting frame, and a bed bottom resting on said berth body, substantially as described.

41. In a passenger vehicle, a foldable lower berth mechanism comprising a foldable head board, substantially as described.

42. In a passenger vehicle, a foldable lower berth mechanism comprising a foldable head board, and a foldable curtain support, substantially as described.

43. In a passenger vehicle, a pair of seats, a foldable lower berth mechanism adapted to rest on said seats and comprising a foldable head board, substantially as described.

44. In a passenger vehicle, a pair of seats, a foldable lower berth mechanism adapted to rest on said seats and comprising a foldable head board and a foldable curtain support, substantially as described.

45. In a passenger vehicle, a pair of seats having backs adapted to be turned into the horizontal position between the seat bodies, and foldable lower berth mechanism adapted to rest upon said seats and comprising head boards, substantially as described.

46. In a passenger vehicle, a pair of seats having backs adapted to be turned into the horizontal position between the seat bodies, and foldable lower berth mechanism adapted to rest upon said seats and comprising head boards and curtain supports, substantially as described.

47. In a passenger vehicle, an upper berth mechanism adapted to fold upward, lower berth mechanism coupled to said upper berth mechanism and adapted to fold against the upper berth mechanism and comprising a folding head board, substantially as described.

48. In a passenger vehicle, an upper berth mechanism adapted to fold upward, lower berth mechanism coupled to said upper berth mechanism and adapted to fold against the upper berth mechanism and comprising a folding head board and folding curtain supporting means, substantially as described.

In testimony whereof I have signed my name this tenth day of February, in the year one thousand nine hundred and seventeen.

GEORGE W. McCAUSLIN.

Copies of this patent may be obtained for five cents each, by addressing the "Commissioner of Patents, Washington, D. C."